United States Patent
Chang et al.

(10) Patent No.: US 10,787,898 B2
(45) Date of Patent: Sep. 29, 2020

(54) DIRECT COUPLING MITIGATION FOR COIL-BASED ELECTROMAGNETIC RANGING

(71) Applicant: Halliburton Energy Services, Inc., Houston, TX (US)

(72) Inventors: Paul Chin Ling Chang, Cypress, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 180 days.

(21) Appl. No.: 15/524,083

(22) PCT Filed: Jul. 7, 2016

(86) PCT No.: PCT/US2016/041350
§ 371 (c)(1),
(2) Date: May 3, 2017

(87) PCT Pub. No.: WO2018/009198
PCT Pub. Date: Jan. 11, 2018

(65) Prior Publication Data
US 2018/0291723 A1    Oct. 11, 2018

(51) Int. Cl.
*E21B 47/024*    (2006.01)
*E21B 47/0228*    (2012.01)
(Continued)

(52) U.S. Cl.
CPC ............. *E21B 47/024* (2013.01); *E21B 7/04* (2013.01); *E21B 7/06* (2013.01); *E21B 47/0228* (2020.05);
(Continued)

(58) Field of Classification Search
None
See application file for complete search history.

(56) References Cited

U.S. PATENT DOCUMENTS

| | | | |
|---|---|---|---|
| 5,065,099 A * | 11/1991 | Sinclair | G01V 3/28 324/339 |
| 8,274,289 B2 * | 9/2012 | Bittar | G01B 7/30 324/338 |

(Continued)

FOREIGN PATENT DOCUMENTS

WO    2014149030    9/2014

OTHER PUBLICATIONS

Ellis, "Filters in Control Systems" Control System Design Guide (Fourth Edition), 2012 (Year: 2012).*

(Continued)

*Primary Examiner* — John C Kuan
(74) *Attorney, Agent, or Firm* — Jason Sedano; C. Tumey Law Group PLLC

(57) ABSTRACT

A method and system for electromagnetic well ranging. The method may comprise receiving signals from one or more receiver coils at different depths in a second wellbore, applying a band-stop filter to the received signals to provide filtered signals, and processing the filtered signals to determine a position of the first wellbore with respect to the second wellbore. An electromagnetic ranging system may comprise a transmitter coil disposed in a second wellbore, a receiver coil disposed in the second wellbore, an information handling system coupled to the transmitter coil and the receiver. The information handling system may be configured to receive signals from one or more receiver coils at different depths in the second wellbore, apply a band-stop filter in a frequency domain to provide filtered signals, and process the filtered signals to determine a position of the first wellbore with respect to the second wellbore.

12 Claims, 5 Drawing Sheets

(51) Int. Cl.
  *E21B 7/04* (2006.01)
  *G01V 3/10* (2006.01)
  *G01V 3/38* (2006.01)
  *E21B 47/092* (2012.01)
  *G01V 3/08* (2006.01)
  *G01V 3/28* (2006.01)
  *G01V 3/26* (2006.01)
  *E21B 7/06* (2006.01)
  *E21B 43/24* (2006.01)
  *E21B 47/12* (2012.01)

(52) U.S. Cl.
  CPC .................. *G01V 3/10* (2013.01); *G01V 3/38* (2013.01); *E21B 43/2406* (2013.01); *E21B 47/092* (2020.05); *E21B 47/12* (2013.01); *G01V 3/08* (2013.01); *G01V 3/26* (2013.01); *G01V 3/28* (2013.01)

(56) References Cited

U.S. PATENT DOCUMENTS

| | | |
|---|---|---|
| 8,912,915 B2 | 12/2014 | Hay et al. |
| 2009/0120691 A1 | 5/2009 | Waters et al. |
| 2010/0044108 A1* | 2/2010 | Bespalov ............... E21B 47/022 175/24 |
| 2011/0309836 A1 | 12/2011 | Bittar et al. |
| 2013/0057287 A1 | 3/2013 | Le et al. |
| 2014/0032116 A1* | 1/2014 | Guner ...................... G01V 3/28 702/6 |
| 2014/0254317 A1* | 9/2014 | Thompson ............. G01V 11/00 367/21 |
| 2015/0091577 A1 | 4/2015 | Donderici et al. |
| 2015/0346381 A1 | 12/2015 | Donderici |
| 2015/0369950 A1* | 12/2015 | Wu .......................... G01V 3/30 702/7 |
| 2016/0041293 A1 | 2/2016 | Boudah et al. |
| 2016/0041296 A1 | 2/2016 | Ahmad et al. |
| 2016/0258288 A1* | 9/2016 | Hay ......................... E21B 7/06 |

OTHER PUBLICATIONS

International Search Report and Written Opinion for Application No. PCT/US2016/041350 dated Apr. 6, 2017.

Y. Yoon, and M. Amin, "Spatial Filtering for Wall-Clutter Mitigation in Through-the-Wall Radar Imaging," IEEE Trans. on Geoscience and Remote Sensing, vol. 47, No. 9, pp. 3192-3208, Sep. 2009.

* cited by examiner

DIRECT COUPLING MITIGATION FOR COIL-BASED ELECTROMAGNETIC RANGING

BACKGROUND

The present disclosure relates to wellbore drilling operations and, more particularly, to well ranging methods and systems for tracking the drilling of a wellbore with respect to another wellbore.

Wellbores drilled into subterranean formations may enable recovery of desirable fluids (e.g., hydrocarbons) using a number of different techniques. Knowing the location of a first wellbore may be important while drilling a second wellbore. For example, in the case of a first wellbore that may be blown out, the first wellbore may need to be intersected precisely by the second (or relief) wellbore in order to stop the blow out. Another application may be where a second wellbore may need to be drilled parallel to the first wellbore, for example, in a steam-assisted gravity drainage ("SAGD") application, wherein the second wellbore may be an injection wellbore while the first wellbore may be a production wellbore. Yet another application may be where knowledge of the first wellbore's location may be needed to avoid collision during drilling of the second wellbore.

Electromagnetic ranging is one technique that may be used to determine the location of a first wellbore with respect to a second wellbore that is being drilled. In electromagnetic ranging, an electromagnetic source may be used to induce currents in conductive tubulars disposed in the first wellbore wherein the induced currents may be received by receivers in the second wellbore. Two different types of electromagnetic ranging may be employed: "galvanic excitation" and "coil excitation." In galvanic excitation, a pair of electrodes disposed on bottom hole assembly may directly inject currents into a formation. The currents may flow to a nearby first wellbore creating a secondary magnetic field, which may be recorded by a receiver on the bottom hole assembly in the second wellbore. In coil excitation, transmitter coils and receiver coils, which both may be tilted, may be disposed on a bottom hole assembly. The transmitter coils may induce currents in the first wellbore, which may produce a secondary electromagnetic field, which may be recorded by receiver coils in the second wellbore. Each method of electromagnetic ranging may have advantages and disadvantages in determining distance and direction of the first wellbore. For example, one disadvantage with coil excitation may be direct coupling between the transmitter coils and the receiver coils, in which non-target signals may transmit to the receiver coils by way of the bottom hole assembly. This may be problematic when a gradient ranging formula is used in processing the signals as it assumes only signals from the target wellbore are being received.

BRIEF DESCRIPTION OF THE DRAWINGS

These drawings illustrate certain aspects of some of the examples of the present invention, and should not be used to limit or define the invention.

DETAILED DESCRIPTION

The present disclosure relates generally to methods for processing signals from a first wellbore to determine distance and direction to the first wellbore relative to a second wellbore that is being drilled. Specifically, the methods relate to the processing of signals received by an electromagnetic ranging system. The disclosure describes methods and systems for reducing and/or removing signals produced by direct coupling between a transmitter coil and a receiver coil. In examples, a band-stop filter may further be used to help identify signals from a target well. Additionally, without limitation, a pre-processing scheme may be employed to further mitigate direct coupling between the transmitter coil and the receiver coil.

Certain examples of the present disclosure may be implemented at least in part with an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Certain examples of the present disclosure may be implemented at least in part with non-transitory computer-readable media. For the purposes of this disclosure, non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
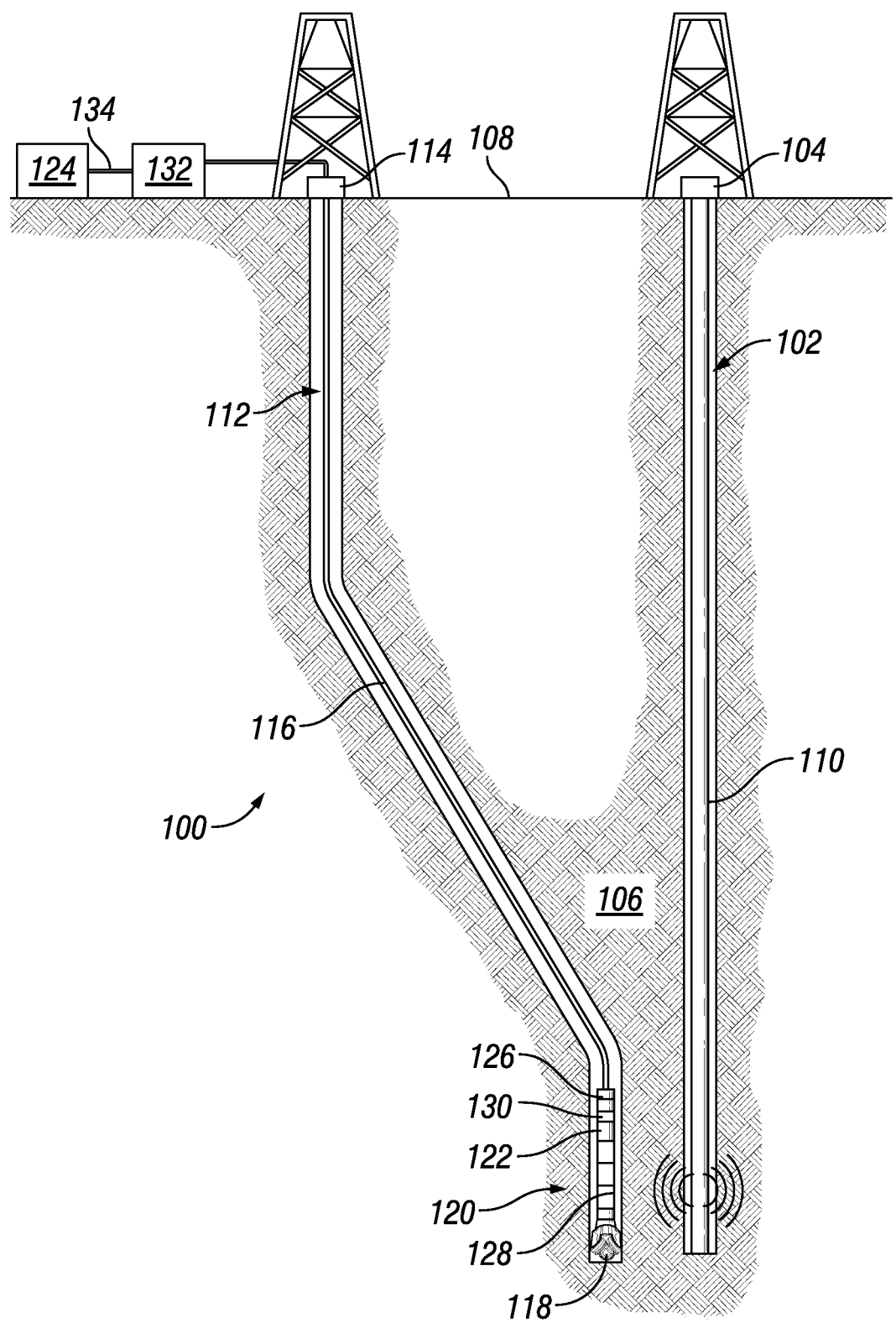
FIG. 1 is an example of an electromagnetic ranging system.

FIG. 1 illustrates an electromagnetic ranging system 100. As illustrated, a first wellbore 102 may extend from a first wellhead 104 into a subterranean formation 106 from a surface 108. Generally, first wellbore 102 may include horizontal, vertical, slanted, curved, and other types of wellbore geometries and orientations. First wellbore 102 may be cased or uncased. A conductive member 110 may be disposed within first wellbore 102 and may comprise a metallic material that may be conductive. By way of example, conductive member 110 may be a casing, liner, tubing, or other elongated metal tubular disposed in first wellbore 102. Determining the position and direction of first wellbore 102 accurately and efficiently may be required in a variety of applications. For example, first wellbore 102 may be a "blowout" well. First wellbore 102 may need to be intersected precisely by a second wellbore 112 in order to stop the "blowout." Alternatively, it may be desired to avoid collision with first wellbore 102 in drilling second wellbore 112 or it may be desired to drill the second wellbore parallel to the first wellbore 102, for example, in SAGD applications. In examples, first wellbore 102 may not be accessible and/or information about the position and structure of first wellbore 102 may not be available. As will be discussed in more detail, electromagnetic ranging system 100 may be used for determining the location of first wellbore 102 with respect to second wellbore 112.

With continued reference to FIG. 1, second wellbore 112 may also extend from a second wellhead 114 that extends into subterranean formation 106 from surface 108. Generally, wellbore 102 may include horizontal, vertical, slanted, curved, and other types of wellbore geometries and orientations. Additionally, while first wellbore 102 and second wellbore 112 are illustrated as being land-based, it should be understood that the present techniques may also be applicable in offshore applications. Second wellbore 112 may be cased or uncased. In examples, a drill string 116 may begin at second wellhead 114 and traverse second wellbore 112. A drill bit 118 may be attached to a distal end of drill string 116 and may be driven, for example, either by a downhole motor and/or via rotation of drill string 116 from surface 108. Drill bit 118 may be a part of bottom hole assembly 120 at distal end of drill string 116. While not illustrated, bottom hole assembly 120 may further comprise one or more of a mud motor, power module, steering module, telemetry subassembly, and/or other sensors and instrumentation as will be appreciated by those of ordinary skill in the art. As will be appreciated by those of ordinary skill in the art, bottom hole assembly 120 may be a measurement-while drilling or logging-while-drilling system.

Without limitation, electromagnetic ranging system 100 may comprise an electromagnetic ranging tool 122. Electromagnetic ranging tool 122 may be a part of bottom hole assembly 120. Electromagnetic ranging tool 122 may be used for determining the distance and direction to first wellbore 102, which may also be referred to as a "target well" or "target wellbore." Additionally, electromagnetic ranging tool 122 may be connected to and/or controlled by information handling system 124, which may be disposed on surface 108. In examples, information handling system 124 may communicate with electromagnetic ranging tool 122 through a communication line (not illustrated) disposed in (or on) drill string 116. In examples, wireless communication may be used to transmit information back and forth between information handling system 124 and electromagnetic ranging tool 122. Information handling system 124 may transmit information to electromagnetic ranging tool 122 and may receive as well as process information recorded by electromagnetic ranging tool 122. In addition, electromagnetic ranging tool 122 may include a downhole information handling system 1264, which may also be disposed on bottom hole assembly 120. Downhole information handling system 126 may include, without limitation, a microprocessor or other suitable circuitry, for receiving and processing signals received by the electromagnetic ranging tool 122. Downhole information handling system 126 may further include additional components, such as memory, input/output devices, interfaces, and the like. While not illustrated, the electromagnetic ranging tool 122 may include one or more additional components, such as analog-to-digital converter and amplifier, among others, that may be used to process the measurements of the electromagnetic ranging tool 122 before they may be transmitted to surface 108. Alternatively, raw measurements from electromagnetic ranging tool 122 may be transmitted to surface 108.

In examples, electromagnetic ranging tool 122 may comprise a transmitter coil 128 and/or a receiver coil 130. It should be noted that bottom hole assembly 120 may comprise a plurality of transmitter coils 128 and/or a plurality of receiver coils 130. Within this disclosure, the term "coil" may denote windings of a wire which may be used to carry a current and/or measure a voltage. Windings may be solenoidal in nature, but may also be other shapes and may further comprise any number of turns, including a single turn. Without limitation, a coil may generate a magnetic moment that may be in a direction perpendicular to the plane of the windings. The transmitter coil 128 and receiver coil 130 may be disposed along a longitudinal axis of the electromagnetic ranging tool 122. Without limitation, transmitter coils 128 may be energized, which may be controlled by information handling system 124, to produce a magnetic field that may be emitted into subterranean formation 106. The magnetic field may energize conductive member 110 within first wellbore 102 by inducing eddy currents in conductive member 110. The eddy current within conductive member 110 may in turn produce a secondary magnetic field. This secondary magnetic field may radiate from first wellbore 102. In examples, the secondary magnetic field may induce voltages in receiver coils 130 that may be recorded and transmitted to surface 108. Using these recorded voltages, the location of first wellbore 102 may be determined. By way of example, the direction and distance of first wellbore 102 may be determined with respect to second wellbore 112.

Any suitable technique may be used for transmitting signals from electromagnetic ranging tool 122 to surface 108, including, but not limited to, mud-pulse telemetry, acoustic telemetry, and electromagnetic telemetry. While not illustrated, bottom hole assembly 120 may include a telemetry subassembly that may transmit telemetry data to the surface. Without limitation, a transmitter in the telemetry subassembly may be operable to generate pressure pulses in the drilling fluid that propagate along the fluid stream to surface 108. At surface 108, pressure transducers (not shown) may convert the pressure signal into electrical signals for a digitizer 132. Digitizer 132 may supply a digital form of the telemetry signals to an information handling system 124 via a communication link 134, which may be a wired or wireless link. The telemetry data may be analyzed and processed by information handling system 124. For example, the telemetry data could be processed to determine a location of first wellbore 102. With the location of first wellbore 102, a driller could control the bottom hole assembly 120 while drilling second wellbore 112 to intentionally intersect first wellbore 102, avoid first wellbore 102, and/or drill second wellbore 112 in a path parallel to first wellbore 102.

Determining location, e.g., distance and direction, of first wellbore 102 relative to second wellbore 112 may take the information recorded by receiver coils 130 about the secondary magnetic field and use the information to determine the distance and direction from bottom hole assembly 120 to first wellbore 102. Determination of distance and direction may be achieved by utilizing the relationship described by Equation (1) below between first wellbore 102 and the magnetic field receivedby receiver coils 130.

$$\overline{H} = \frac{I}{2\pi r}\hat{\phi} \tag{1}$$

Wherein H is the magnetic field vector, I is the current on conductive member 110 in first wellbore 102, r is the shortest distance between the receiver coil(s) 130 and conductive member 110, and φ is a vector that is perpendicular to both z axis of receiver coil(s) 130 and the shortest vector that connects conductive member 110 to receiver coil(s) 130. It should be noted that this simple relationship assumes constant conductive member 110 current along first wellbore 102, however, persons of ordinary skill in the art will appreciate that the concept may be extended to any current distribution by using the appropriate model. It may be clearly seen that both distance and direction can be calculated by using this relationship.

$$r = \frac{I}{2\pi|\overline{H}|} \tag{2}$$

$$\Phi = \text{angle}(\hat{x}\cdot\overline{H}, \hat{y}\cdot\overline{H}) + 90 \tag{3}$$

where · is the vector inner-product operation. It has been observed by experience that Equation (3) is a reliable measurement of the relative direction of conductive member 110 with respect to receiver coil(s) 130 coordinates, and it may be used as long as signal received from conductive member 110 may be substantially large compared to measurement errors. However, Equation (2) may not be reliably used to calculate distance since a direct or accurate measurement of I does not exist. Specifically, it has been observed that any analytical calculation of I may be as much as 50% off due to unknown conductive member 110 characteristics. Furthermore, any in-situ calibration of I may not produce a system reliable enough to be used in electromagnetic ranging due to variations in conductive member 110 current due to changing subterranean formation 106 resistivity and skin depth at different sections of a wellbore. As a result, the systems that measure absolute magnetic field values may not be suitable for electromagnetic ranging applications.

In examples, magnetic field gradient measurements may be utilized, where spatial change in the magnetic field may be measured in a direction that may have a substantial component in the radial (r-axis) direction as below:

$$\frac{\partial \overline{H}}{\partial r} = -\frac{I}{2\pi r^2}\hat{\phi} \tag{4}$$

Wherein φ is the partial derivative. With this gradient measurement available in addition to an absolute measurement, it may be possible to calculate the distance using a gradient ranging formula as follows:

$$r = \frac{|\overline{H}|}{\left|\frac{\partial \overline{H}}{\partial r}\right|} \tag{5}$$

As such, Equation (5) may not require knowledge of the conductive member 110 current I, if both absolute and gradient measurements are available. The direction measurement may still be made as shown in Equation (3). Thus, the gradient ranging formulas may be used to transform information recorded by receiver coils 130 into distance and direction measurements.

The described gradient ranging formulas may be based on assumptions that only first wellbore 102 current exists, which may not be the case for coil excitation due to strong direct coupling between transmitter coil 128 and receiver coil 130. Direct coupling generally may refer to the signal produced by transmitter coil 128 and received directly by receiver coil 130, which may be transmitted through bottom hole assembly 120. Thus, in order to use the gradient ranging formulas described above for first wellbore 102 ranging, the direct coupling may need to be sufficiently mitigated.

Figure 2:
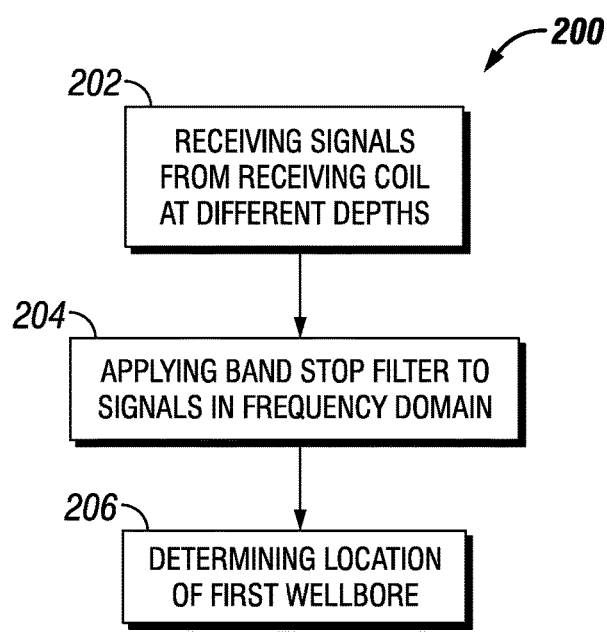
FIG. 2 is an example of a method for electromagnetic ranging.

FIG. 2 illustrates an example of a method 200 that may be used to mitigate the direct coupling between transmitter coils 128 and receiver coils 130 (e.g., shown on FIG. 1) in electromagnetic ranging. Specifically, spatial filtering may be utilized to manipulate data during processing of data received and recorded by receiver coils 130. By mitigation of direct coupling, the gradient ranging formulas discussed above may be used, which may simplify data processing. In addition, mitigation of direct coupling may also mitigate variations due to formation resistivities, thus enabling potential operation at lower frequencies. In addition, mitigation of direct coupling may also allow EM ranging system 100 to perform better in closer ranges, e.g., where first wellbore 102 may be less than 20 meters away from second wellbore 112.

Figure 3:
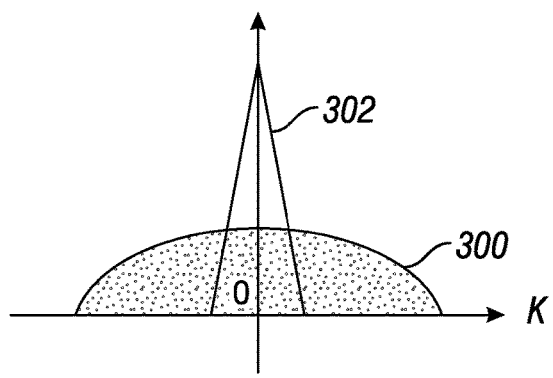
FIG. 3 is an example of signals recorded by a receiver coil.

Without limitation, method 200 may include receiving signals from receiver coil 130 (or a plurality of receiver coils 130) at different depths (block 202), applying a band-stop filter to the signals in the frequency domain (block 204), and determination location of first wellbore 102 (block 206). Each of the signals received at block 202 may generally correspond to an electromagnetic signal received by one of the receiver coil 130 at a particular depth in second wellbore 112. As second wellbore 112 may drill deeper, additional measurements may be taken so that additional signals may be received by receiver coil 130. As previously described, direct coupling through bottom hole assembly 120 may be found in the form of azimuthal currents and axial currents in bottom hole assembly 120, which may affect the electromagnetic signals received by receiver coils 130. FIG. 3 illustrates hypothetical electromagnetic signals that may be recorded by a receiver coil 130 at different depths, wherein magnitude of the signals is shown versus spatial frequency. In FIG. 3, first wellbore signals may be shown at 300 while direct coupling signals may be shown at 302. As illustrated, the direct coupling signals 302 may be large, especially at lower frequencies, as comparted to first wellbore signals 300, which may obscure information related to the direction and depth of first wellbore 102.

Figure 4:
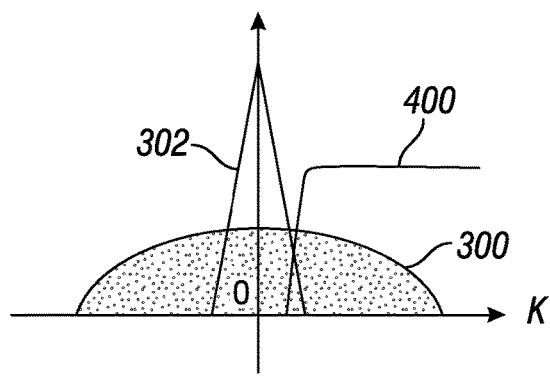
FIG. 4 illustrates the example of FIG. 3 with a band-stop filter.

At block 204 of FIG. 2, method 200 shown on FIG. 2 may include applying a band-stop filter to the electromagnetic signals in the frequency domain. By use of the band-stop filter, the impact of direct coupling may be filtered out of the electromagnetic signals. In addition, this may allow for the use of gradient ranging formulas for coil excitation after removing direct coupling and may allow electromagnetic ranging system 100 to operate at lower frequencies to mitigate variations due to subterranean formation 106 resistivity. FIG. 4 illustrate application of a band-stop filter 400 in the form of a notch filter to filter the direct coupling signals 302 from the first wellbore signals 300.

Without limitation, application of the band-stop filter in block 204 may further include converting the electromagnetic signals from block 202 to the frequency domain. As will be appreciated by those of ordinary skill in the art, a Fast Fourier Transform may be used to convert the electromagnetic signals from their original domain (e.g., spatial) to a representation in the frequency domain for filtering. The Fast Fourier Transform may be applied to measurements at different depths to illustrate the recorded signal in a spatial frequency domain. After the band-stop-filter has been applied to the electromagnetic signal, the filtered signal may be converted back to the spatial domain. By way of example, the filtered signal may be processed by an Inverse Fast Fourier Transform. The Inverse Fast Fourier Transform may convert the filtered signal in the frequency domain to a filtered signal in the spatial domain.

Suitable band-stop filters may generally include filters that pass most frequencies without alteration, but attenuate frequencies in a specific range. The upper threshold of the spatial frequency may be about 0.01 cycles per meter to about 0.2 cycles per meter and the lower threshold may be about 0 cycles per meter to about 0.1 cycles per meter. Without limitation, any of a variety of different band-stop filters may be used, including high-pass filters. In examples, a high-pass filter may be used to remove low-frequency contents from a recorded signal. Using a high-pass filter may assume that signals from first wellbore 102 may vary with space and depth, whereas returns from an unwanted direct signal assume constant and/or low-frequency values. In additional examples, a band-stop filter may comprise a zero-phase Infinite Impulse Response ("IIR") Filter, such as a notch filter. An IIR filter may produce smaller delays compared to a Finite Impulse Response ("FIR") filters and may process results are may be closer to real time. In drilling applications, electromagnetic ranging system 100 may be employed for geosteering. Without limitation, geosteering may refer to the process of steering a drill bit through a formation in any direction through an automated process. Thus, electromagnetic ranging system 100 may comprise a filter with a lower delay, which may allow for decisions to be made in a timely manner.

At block 206 of FIG. 2, the filtered signal may be used to determine the distance and direction to first wellbore 102 using gradient ranging formulas, such as Equations (1) to (5) provided above. Determining the distance and direction of first wellbore 102 may include calculating a magnetic field gradient as described above. The distance and direction to the first wellbore 102 with respect to second wellbore 112 may then be calculated based on the magnetic field gradient. With the distance and direction of first wellbore 102, an operator may adjust one or more drilling parameters for second wellbore 112, such as trajectory of the second wellbore 112 path. These adjustment may be made, for example, to intentionally intersect first wellbore 102, avoid collision with first wellbore 102, or to drill second wellbore 112 in a path parallel to first wellbore 102.

As will be appreciated, method 200 shown on FIG. 2 may be implemented at surface 108, in wellbore 112, or a combination thereof. For example, information handling system 124 (e.g., shown on FIG. 1) may be used to implement method 200, whether in whole or in part. By way of further example, method 200 may be implemented downhole in second wellbore 112. Processing may be performed, in whole or in part, in electromagnetic ranging tool 122, for example, using downhole information handling system 124, and transmitted up-hole to surface 108. In additional examples, signals recorded by receiver coils 130 may be transmitter up-hole to information handing system 124 for processing. In still further examples, partial processing may take place downhole in second wellbore 112 using, for example, downhole information handling system 124, and the partial processed information may be transmitter up-hole to surface 108 for final processing. It should be noted that partial processing, final processing, and/or processing in general may be performed by a plurality of information handling systems, such as information handling system 124 disposed on surface 108 or Downhole information handling system 126 disposed downhole in second wellbore 112.

Figure 5:
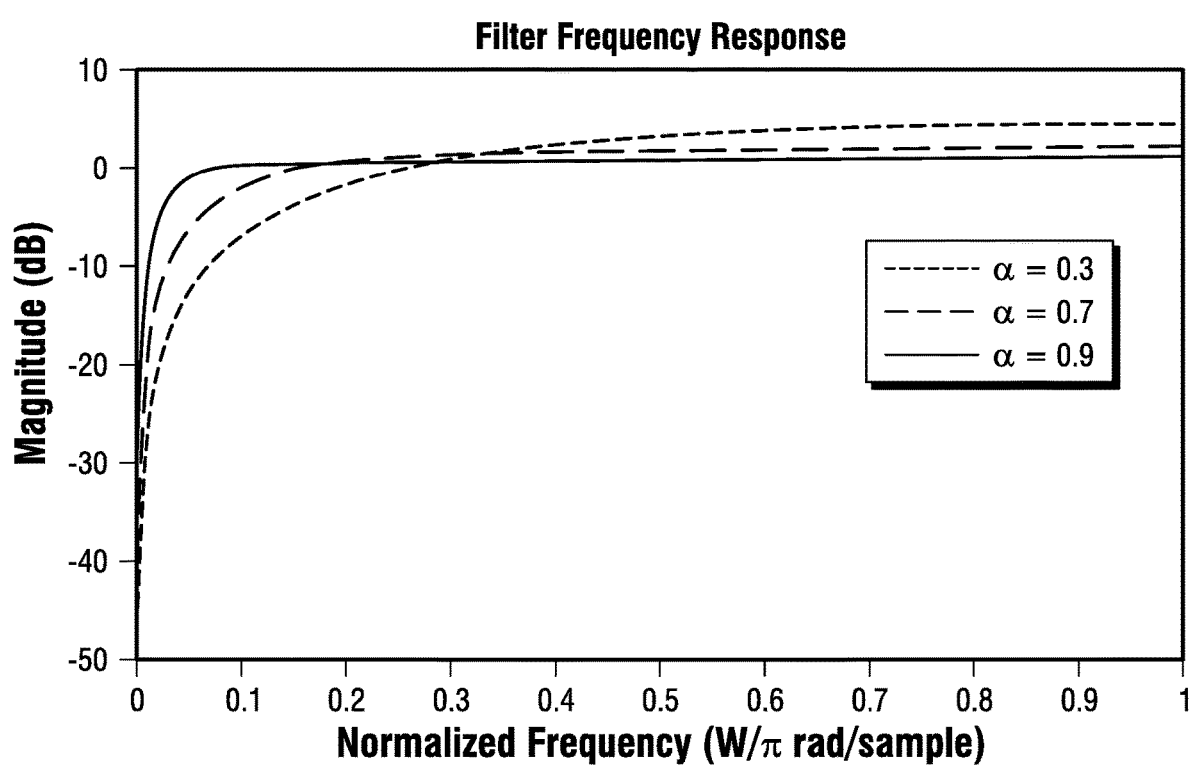
FIG. 5 is a graph showing the frequency response of an example filter.

As previously described, one example of a suitable band-stop filter may include zero-phase IIR filters, such as notch filters, which may provide flexible designs. An example of a suitable zero-phase IIR filter, in the form of notch filter, that rejects zero frequency contents may be described below:

$$H(w) = \frac{1 - e^{-jw}}{1 - \alpha e^{-jw}} \qquad (6)$$

Wherein H is the frequency response of the filter, w is the angular frequency, and j represents complex number $\sqrt{-1}$, α may be a positive value between zero and one. The parameter a may be a user-defined parameter that changes the stopband of the IIR filter. FIG. 5 is a chart illustrating the frequency response of an IIR filter, described by Equation (6) for three different values of a, namely 0.3, 0.7, and 0.9. It may be illustrated in FIG. 5 that as a moves closer to one, the stopband may be very narrow and most signals besides direct coupling signals may pass through the filter. As α decreases, the stopband increases and more contents at higher frequencies of the spatial spectrum may also be let through. In examples, there may be some overlapping between direct coupling and first wellbore 102 signals in the spatial frequency spectrum, choosing a may become a parameter to decide the tradeoff between preserving first wellbore 102 signals at the expense of some unfiltered direct coupling signals and/or mitigating all the direct coupling signals at the expense of first wellbore 102 signals. Thus, the choice of α may be adjusted and tuned at a value that works best for a specific downhole environment.

To improve the performance of spatial filtering, it may be better to mitigate direct coupling as much as possible prior to sending a recorded signal through the filters in processing. As described above, direct coupling may be defined as all signals that are not from first wellbore 102 and originate from transmitter coil 128, which may be coupled to receiver coil 130 through bottom hole assembly 120, subterranean formation 106, drilling mud (not illustrated), and optional ferrite sleeves (not illustrated). In coil excitation, the direct coupling may be broken into two portions: the direct signal from the transmitter coil 128 and the coupling through bottom hole assembly 120. In examples, coupling through bottom hole assembly 120 may be further broken into two portions: contributions from azimuthal currents on bottom hole assembly 120 and contributions from axial currents on bottom hole assembly 120. Presence of bottom hole assembly 120 may increase the direct coupling by a large factor, for example, of about ten to a factor of about one hundred, depending on a number of factors, including transmitter-receiver separation. Accordingly, signal (e.g., measured voltage) at the receiver coil 130 may be expressed by the following equation:

$$V^{Receiver} = V^{Direct} + V^{FirstWellbore} = \qquad (7)$$
$$(V^{TransmitterCoil} + V^{AzimuthalBHA} + V^{AxialBHA}) + V^{FirstWellbore}$$

Where $V^{Receiver}$ is the measured voltage at receiver coil 130, $V^{Direct}$ is the voltage contributions due to direct coupling, and $V^{TransmitterCoil}$, $V^{AzimuthalBHA}$, $V^{AxialBHA}$, and $V^{TargetWell}$ represent the voltage contributions due to transmitter coil 128, azimuthal current, axial current, and first wellbore 102. In Equation (7), the terms $V^{TransmitterCoil}$, $V^{AzimuthalBHA}$, and $V^{AxialBHA}$ represent the direct coupling ($V^{Direct}$).

Therefore, a pre-processing step may be used to cancel and/or minimize the contributions of direct current from the transmitter coil ($V^{TransmitterCoil}$) azimuthal currents ($V^{AzimuthalBHA}$), and axial currents ($V^{AxialBHA}$) prior to the spatial filtering discussed above with respect to FIG. 2. By way of example, different orientations of the receiver coils 130 may be exploited prior to spatial filtering to further mitigate direct coupling contributions from azimuthal bottom hole assembly 120 currents, axial bottom hole assembly 120 currents, and transmitter coils 128, which may enhance the performance of spatial filtering.

Figure 6:
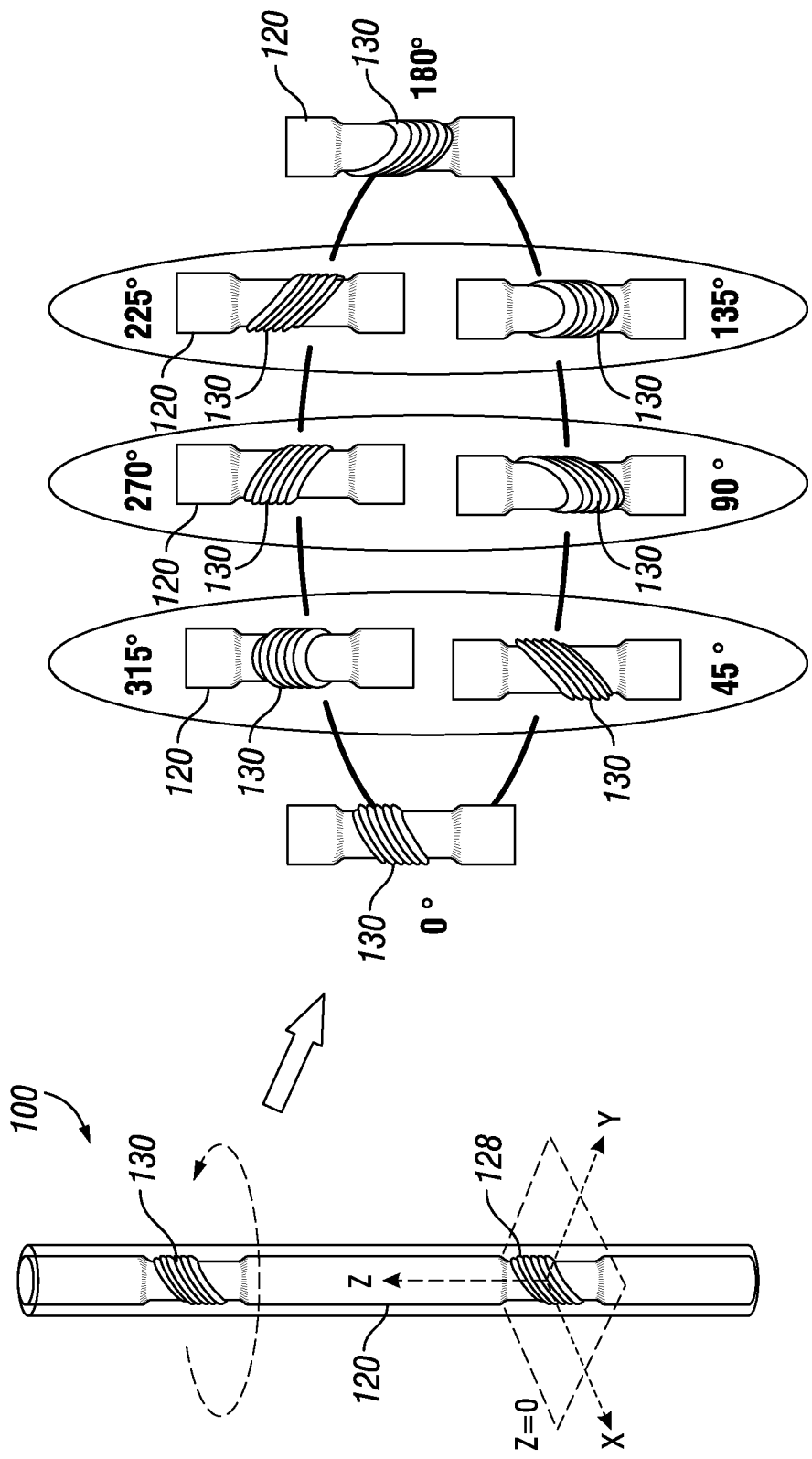
FIG. 6 is an example of EM ranging system rotating receiver coils into different orientations.

To mitigate direct coupling prior to spatial filtering, an EM ranging system 100 may rotate receiver coils 130 at different orientations, as illustrated in FIG. 6. The orientation of transmitter coil 128 may be fixed while the orientations of receiver coil 130 may change as receiver coil 130 rotates around z-axis of bottom hole assembly 120. In examples, there may be a plurality of receiver coils 130 which may be tilted and oriented in different directions. For example, symmetric orientation pairs of receiver coils 130 with respect to transmitter coil 128 may have rotations of 45° and 315°, 270° and 90°, 225° and 135° about z-axis of bottom hole assembly 120. For mitigation, measurements from pairs of receiver coils 130 oriented symmetrically with respect to transmitter coil 128 ($V^{TransmitterCoil}$) may be used. Because they are symmetrically oriented, the voltage due to transmitter coil 128 ($V^{TransmitterCoil}$) may be the same between the pair of receiver coils 130. Additionally, because the two orientations differ by only a rotation around z-axis of bottom hole assembly 120, contributions from the azimuthal current ($V^{AzimuthalBHA}$) may also be the same. However, axial currents ($V^{AxialBHA}$), due to symmetry of the pair of receiver coils 130, may cause the voltage to have opposite signs. Thus, two voltage readings at $V_1$ and $V_2$ of a symmetric orientation pair of receiver coils 130 at a given depth may be expressed as below:

$$V_1 = (V^{TransmitterCoil} + V^{AzimuthalBHA} + V^{AxialBHA}) + V_1^{FirstWellbore} \qquad (8)$$

$$V_2 = (V^{TransmitterCoil} + V^{AzimuthalBHA} + V^{AxialBHA}) + V_2^{FirstWellbore} \qquad (9)$$

where $V^{TransmitterCoil}$, $V^{AxialBHA}$, and $V^{FirstWellbore}$ may be common terms. Thus, to cancel out the contribution from transmitter coil 128 and azimuthal currents ($V^{AzimuthalBHA}$), the following manipulation of algebraic equations may be used:

$$V_{1-2} = \frac{V_1 - V_2}{2} = V^{AxialBHA} + \frac{V_1^{FirstWellbore} - V_2^{FirstWellbore}}{2} \qquad (10)$$

To cancel out the contribution from axial currents ($V^{AxialBHA}$), the equation below may be applied:

$$V_{1+2} = \frac{V_1 + V_2}{2} = \qquad (11)$$
$$V^{TransmitterCoil} + V^{AzimuthalBHA} + \frac{V_1^{FirstWellbore} + V_2^{FirstWellbore}}{2}$$

The manipulated voltages $V_{1-2}$ and $V_{1+2}$ may then be passed through spatial filtering separately, for example, as described above with respect to FIG. 2, which may result in the following:

$$\tilde{V}_{1-2} = \tilde{V}^{AxialBHA} + \frac{V_1^{FirstWellbore} - V_2^{FirstWellbore}}{2} \qquad (12)$$

$$\tilde{V}_{1+2} = \qquad (13)$$
$$\tilde{V}^{TransmitterCoil} + \tilde{V}^{AzimuthalBHA} + \frac{V_1^{FirstWellbore} + V_2^{FirstWellbore}}{2}$$

Thus, the voltages of the symmetric orientation pair of transmitter coils 128 with direct coupling may be mitigated and expressed as the below equations:

$$\tilde{V}_1^{FirstWellbore} = V_{1+2} + V_{1-2} \qquad (14)$$

$$\tilde{V}_2^{FirstWellbore} = V_{1+2} - V_{1-2} \qquad (15)$$

Figure 7:
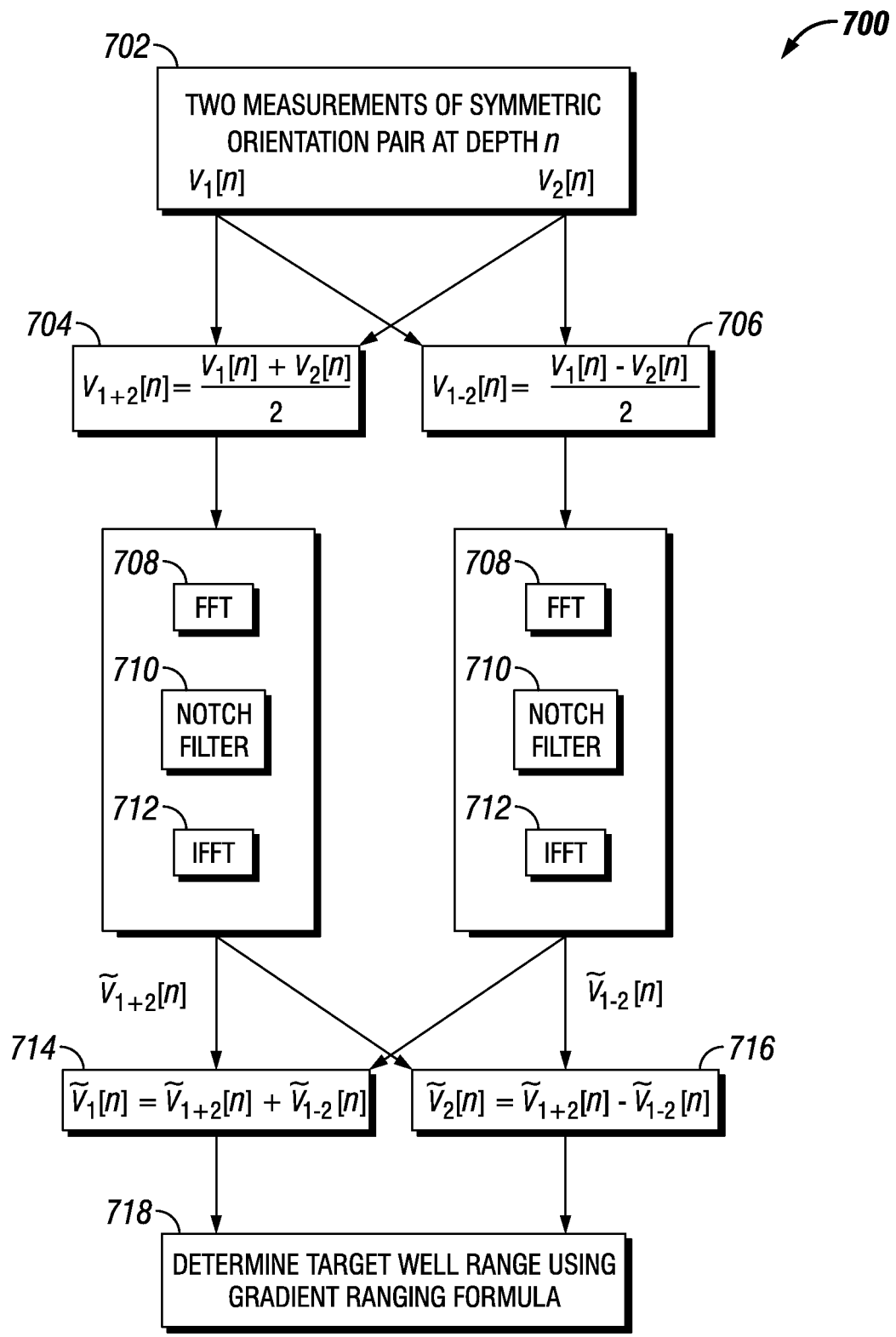
FIG. 7 is an example of a method for mitigating direct coupling that includes a pre-processing step.

Referring now to FIG. 7, a flow chart is provided of an example method 700 that may be used to mitigate the direct coupling between transmitter coils 128 and receiver coils 130 (e.g., shown on FIG. 1) that further includes a pre-processing step. At block 702, voltage measurements may be received from a symmetric orientation pair of transmitter coils 128 at depth n, represented by $V_1[n]$ and $V_2[n]$. $V_1[n]$ may be the voltage measured for Receiver 1 of the symmetric orientation pair and $V_2[n]$ may be the voltage measured for Receiver 2 of the symmetric orientation pair. At block 704, contribution to the voltage measurements from axial currents ($V^{AxialBHA}$) may be removed. For example, Equation (11) above may be applied at depth n, as set forth below:

$$V_{1+2}[n] = \frac{V_1[n] + V_{2[n]}}{2} \qquad (16)$$

Where $V_{1+2}[n]$ is the axially corrected voltage measurement at depth n. At block 706, contribution to the voltage measurements from transmitter coil 128 and azimuthal currents ($V^{AzimuthalBHA}$) may be cancelled out. For example, Equation (10) above may be applied at depth n, as set forth below:

$$V_{1-2}[n] = \frac{V_1[n] - V_{2[n]}}{2} \quad (17)$$

Where $V_{1-2}[n]$ is the azimuthally corrected voltage measurement at depth n. The corrected voltages ($V_{1+2}[n]$, $V_{1-2}[n]$) from Equations (16) and (17) may then be separately processed to mitigate directly coupling using spatial filtering. At block 708, the method 700 may further include converting the corrected voltages to the frequency domain. For example, a Fast Fourier Transform may be used to convert the corrected voltages from their original domain (e.g., spatial) to a representation in the frequency domain for filtering. This may be applied to measurements at different depths. At block 710, a band-stop filter may be applied to the corrected voltages in the frequency domain. Suitable band-stop filters, such as notch filters, are described above with respect to FIG. 2. At block 712, the filtered voltages may be converted back to the spatial domain to provide $\tilde{V}_{1-2}$ and $\tilde{V}_{1+2}$, respectively, wherein $\tilde{V}_{1-2}$ is a filtered voltage measurement that is azimuthally corrected and $\tilde{V}_{1+2}$ is a filtered voltage measurement that is axially corrected. By way of example, the filtered voltages may be processed by an Inverse Fast Fourier Transform. At block 714, the filtered voltages may be added to provide a filtered voltage measurement for Receiver 1. For example, Equation (14) above may be applied at depth n, as set forth below:

$$\tilde{V}_1^{FirstWellbore}[n] + V_{1+2}[n] + V_{1-2}[n] \quad (18)$$

At block 716, the filtered voltages may be subtracted to provide a filtered voltage measurement for receiver 128. For example, Equation (15) above may be applied at depth n, as set forth below:

$$\tilde{V}_2^{FirstWellbore}[n] + V_{1+2}[n] - V_{1-2}[n] \quad (19)$$

At block 718, the filtered voltage measurements may be processed to determine a location of first wellbore 102. For example, gradient ranging formulas, such as Equations (1) to (5) provided above, may be used to determination the distance and direction to first wellbore 102 with respect to second wellbore 112. With the distance and direction of first wellbore 102, an operator may adjust one or more drilling parameters for second wellbore 112, such as trajectory of the second wellbore 112 path. These adjustments may be made, for example, to intentionally intersect first wellbore 102, avoid collision with first wellbore 102, or to drill second wellbore 112 in a path parallel to first wellbore 102.

A method for electromagnetic well ranging a first wellbore may comprise receiving signals from one or more receiver coils at different depths in a second wellbore, applying a band-stop filter to the received signals to provide filtered signals, and processing the filtered signals to determine a position of the first wellbore with respect to the second wellbore. The method may further comprises drilling the second wellbore and adjusting one or more drilling parameters in response to the position of the first wellbore. The drilling parameters may be adjusted to avoid intersection of the second wellbore with the first wellbore, to intentionally intersect the first wellbore with the second wellbore, and/or to drill the second wellbore in a path that is parallel to the first wellbore. In examples, the band-stop filter may be an Infinite Impulse Response Filter or a Finite Impulse Response Filter. Additionally, the method may comprise disposing an electromagnetic ranging tool in the second wellbore, wherein the electromagnetic ranging tool comprises a transmitter coil disposed on a bottom hole assembly, and the one or more receiver coils may be disposed on the bottom hole assembly.

A method for electromagnetic well ranging may comprise receiving signals which may comprise voltage measurements. Received signals from one or more receiver coils comprises receiving signals from a pair of receiver coils that may be symmetrically orientation pairs having orientations that differ by rotation around a z-axis of a bottom hole assembly on which the receiver coils may be disposed. The method may further comprise applying a band-stop filter to the received signals to provide filtered signal. The band-stop filter is a notch filter, which may be an infinite impulse response filter. The band-stop filter may be applied to remove direct coupling between one or more receiver coils and a transmitter coil. The method may apply the band-stop filter in a frequency domain, which may comprise converting the signals from a spatial domain to the frequency domain with a Fast Fourier Transform, and converting the filtered signals from the frequency domain to the spatial domain. In examples, the received signals may be pre-processed prior to converting the signals from a spatial domain to the frequency domain. Additionally, processing the filtered signals may comprise applying a gradient ranging formula to the filter signals to determined distance and direction to the first wellbore.

Without limitation, a method for electromagnetic well ranging a first wellbore comprise receiving voltage measurements from a symmetric orientation pair of receiver coils. The receiver coils may be disposed in a second wellbore. Additionally, the method may further comprise removing at least a portion of azimuthal voltage from the voltage measurements to provide azimuthally corrected voltage measurements, removing at least a portion of axial voltage from the voltage measurements to provide axially corrected voltage measurements, separately filtering the azimuthally corrected voltage measurements and the axially corrected voltage measurements in a frequency domain to provide filtered voltage measurements, determining filtered voltage for a first receiver of the symmetric orientation pair and a second receiver of the symmetric orientation pair, and processing the filtered voltages to determine a position of the first wellbore with respect to the second wellbore. In examples, separately filtering the azimuthally corrected voltage measurements and the axially corrected voltage measurements in a frequency domain comprises converting to the frequency domain, applying a band-stop filter, and converting to the spatial domain. In further examples, processing the filtered voltages comprises applying a gradient ranging formula to determine the distance and direction to the first wellbore.

An electromagnetic ranging system for ranging a first wellbore may comprise a transmitter coil disposed in a second wellbore, a receiver coil disposed in the second wellbore, an information handling system coupled to the transmitter coil and the receiver. The information handling system may be configured to receive signals from one or more receiver coils at different depths in the second wellbore, apply a band-stop filter in a frequency domain to provide filtered signals, and process the filtered signals to determine a position of the first wellbore with respect to the second wellbore. In examples, the transmitter coil and receiver coil may be disposed on a bottom hole assembly. In examples, the receiver coil may be a component of a symmetric orientation pair of receiver coils disposed on the bottom hole assembly. The receiver coils have orientations that may be different by rotation around a z-axis of the bottom hole assembly. Without limitation, the information handling system may be disposed in the wellbore.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for electromagnetic well ranging a first wellbore, comprising:
   receiving a first set of signals at one or more receiver coils at different depths in a second wellbore, wherein the one or more receiver coils are oriented symmetrical with a transmitter coil about an axis of a bottom hole assembly;
   rotating the one or more receiver coils around the axis of the bottom hole assembly;
   receiving a second set of signals at the one or more receiver coils in the second wellbore, wherein the one or more receiver coils are oriented non-symmetrical with the transmitter coil about the axis of the bottom hole assembly;
   applying a band-stop filter to the first set of signals and second set of signals to provide filtered signals; and
   processing the filtered signals to determine a position of the first wellbore with respect to the second wellbore.

2. The method of claim 1, further comprising drilling the second wellbore and adjusting one or more drilling parameters in response to the position of the first wellbore.

3. The method of claim 2, wherein the drilling parameters are adjusted to avoid intersection of the second wellbore with the first wellbore, to intentionally intersect the first wellbore with the second wellbore, or to drill the second wellbore in a path that is parallel to the first wellbore.

4. The method of claim 1, wherein the band-stop filter is an Infinite Impulse Response Filter or a Finite Impulse Response Filter.

5. The method of claim 1, further comprising disposing an electromagnetic ranging tool in the second wellbore, wherein the electromagnetic ranging tool comprises the transmitter coil disposed on the bottom hole assembly, and the one or more receiver coils disposed on the bottom hole assembly.

6. The method of claim 1, wherein the first set of signals and second set of signals comprise voltage measurements.

7. The method of claim 1, wherein the processing the filtered signals comprises applying a gradient ranging formula to the filtered signals to determine distance and direction to the first wellbore.

8. The method of claim 1, wherein the band-stop filter is a notch filter.

9. The method of claim 8, wherein the notch filter is an infinite impulse response filter.

10. The method of claim 1, wherein the band-stop filter removes direct coupling between the one or more receiver coils and the transmitter coil.

11. The method of claim 1, wherein the applying a band-stop filter in a frequency domain comprises converting the first set of signals and second set of signals from a spatial domain to the frequency domain with a Fast Fourier Transform, and converting the filtered signals from the frequency domain to the spatial domain.

12. The method of claim 11, wherein the first set of signals and second set of signals may be pre-processed prior to the converting the first set of signals and second set of signals from a spatial domain to the frequency domain.

* * * * *